United States Patent [19]

Graham

[11] 4,382,314
[45] May 10, 1983

[54] POULTRY EVISCERATOR WITH MOVABLE WORK CYLINDER

[76] Inventor: Kenneth Z. Graham, Rte. 2, Dawsonville, Ga. 30534

[21] Appl. No.: 241,834

[22] Filed: Mar. 9, 1981

[51] Int. Cl.³ .......................................... A22C 21/06
[52] U.S. Cl. ........................................................ 17/11
[58] Field of Search .............................................. 17/11

[56] References Cited

U.S. PATENT DOCUMENTS

| 3,499,184 | 3/1970 | Frederick et al. | 17/11 |
| 3,653,093 | 4/1972 | Scheier | |
| 3,806,988 | 4/1974 | Harben, Jr. | |
| 3,902,221 | 9/1975 | Harben, Jr. et al. | |
| 3,979,793 | 9/1976 | Hazenbroek | 17/11 |
| 4,308,639 | 1/1982 | van Mil | 17/11 |

FOREIGN PATENT DOCUMENTS 2021134  7/1970  France .................................. 17/11

OTHER PUBLICATIONS

Evisomate Eviscerator Leaflet (2 sides).
New! Systemate Eviscerator Leaflet (1 side).
Tieleman B. V., Eviscerator Pictorial Drawing-1978.

*Primary Examiner*—Willie G. Abercrombie
*Attorney, Agent, or Firm*—George M. Thomas

[57] ABSTRACT

A plurality of birds suspended from an overhead conveyor are received in series at the work stations 30 of the outer rotatable work cylinder 29 of the eviscerator. Bird holders 105 are moved by stationary cams 100 and 119 to hold the birds at each work station for an arc of travel of approximately 180° about the eviscerator, and eviscerator tools 74 are moved by stationary cams 19 and 22 down into the cavity of each bird and then extracted therefrom to remove the viscera from the bird. A pair of vertical guide bars 37 are carried at each work station within the work cylinder and the upper and lower carriages 41 and 94 which support the eviscerator tools 74 and bird holders 105 reciprocate along the lengths of the guide bars. The work cylinder can be progressively raised or lowered by the simultaneous rotation of work cylinder mounting rods 28.

10 Claims, 8 Drawing Figures

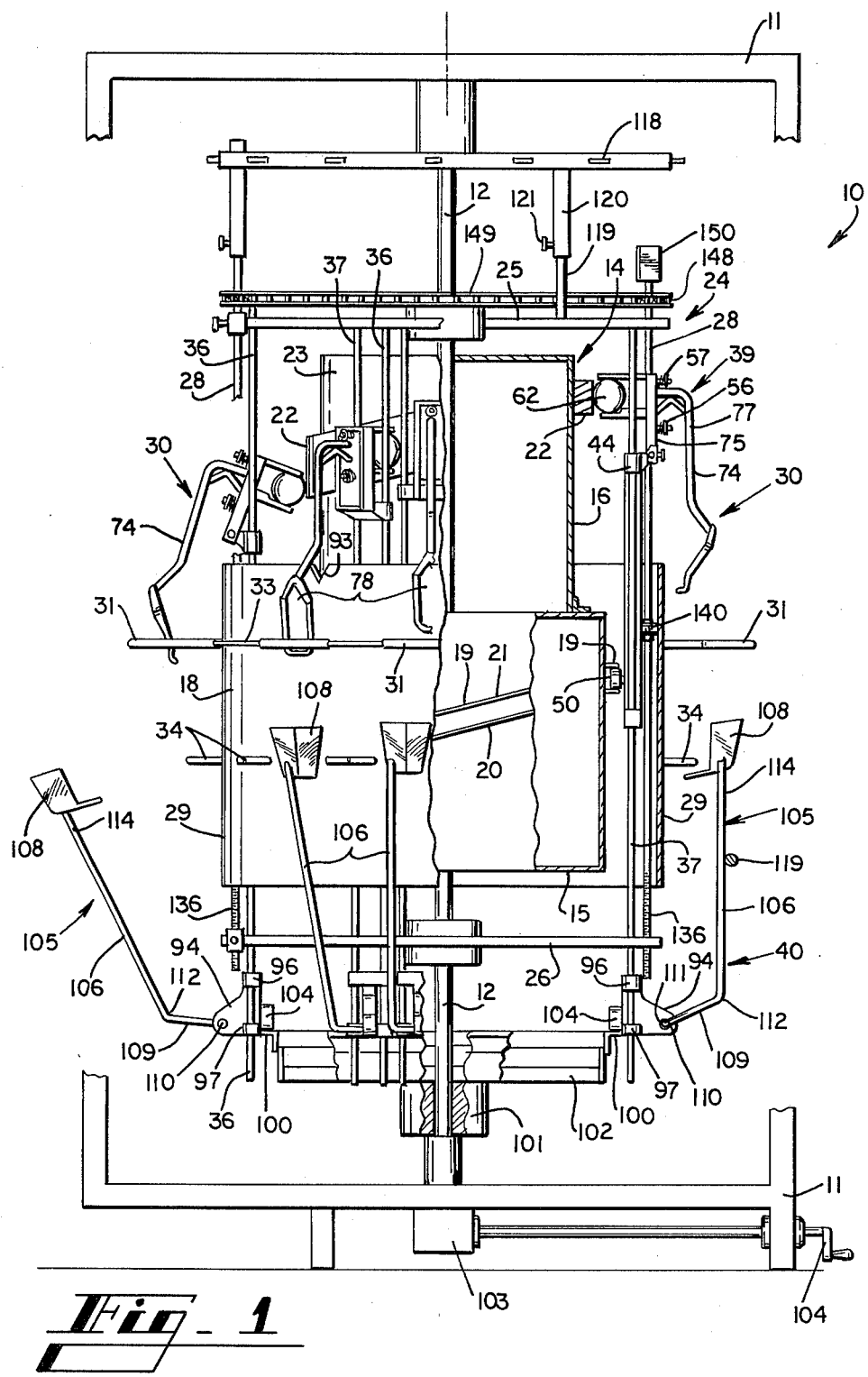

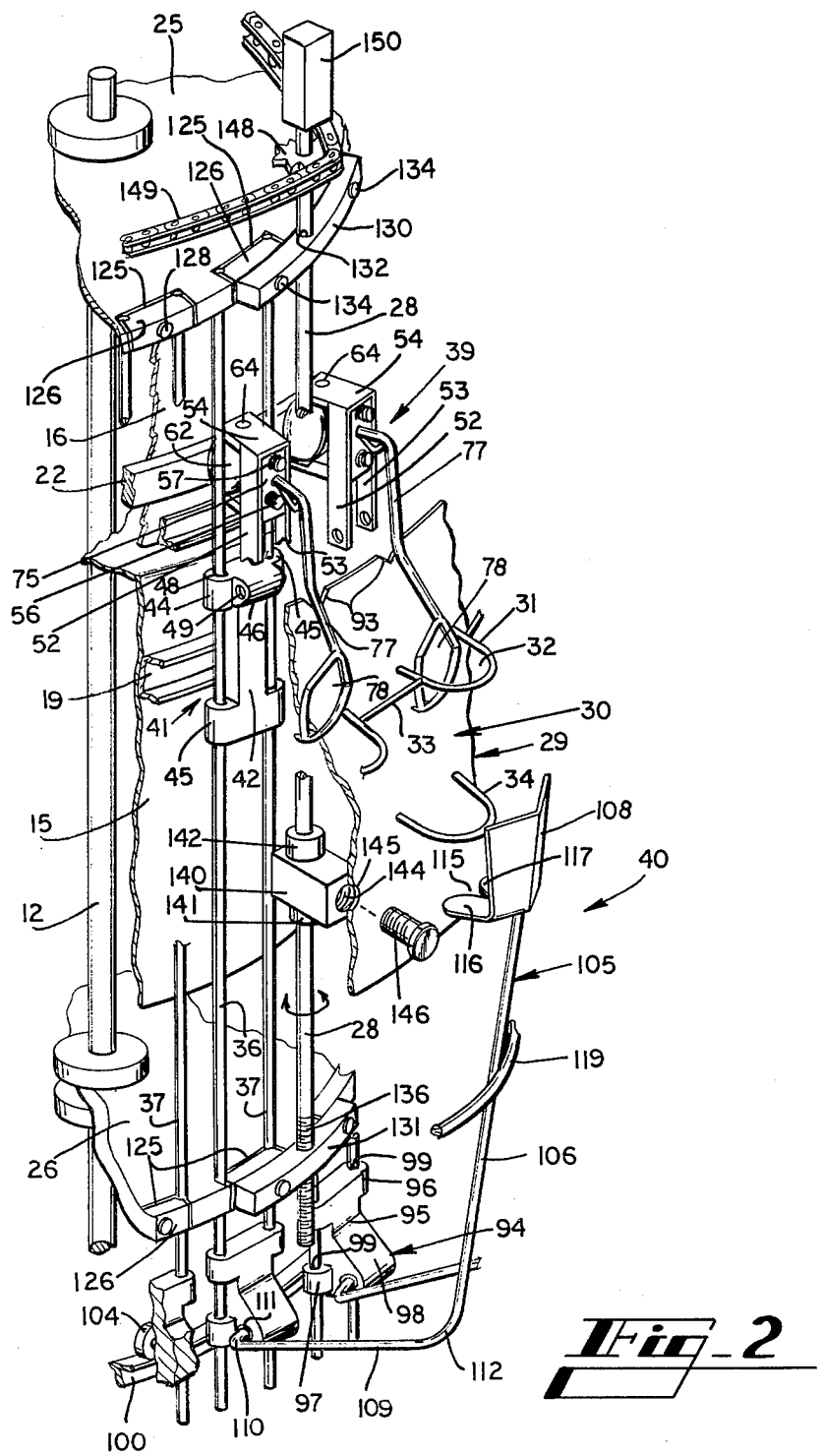
Fig_2

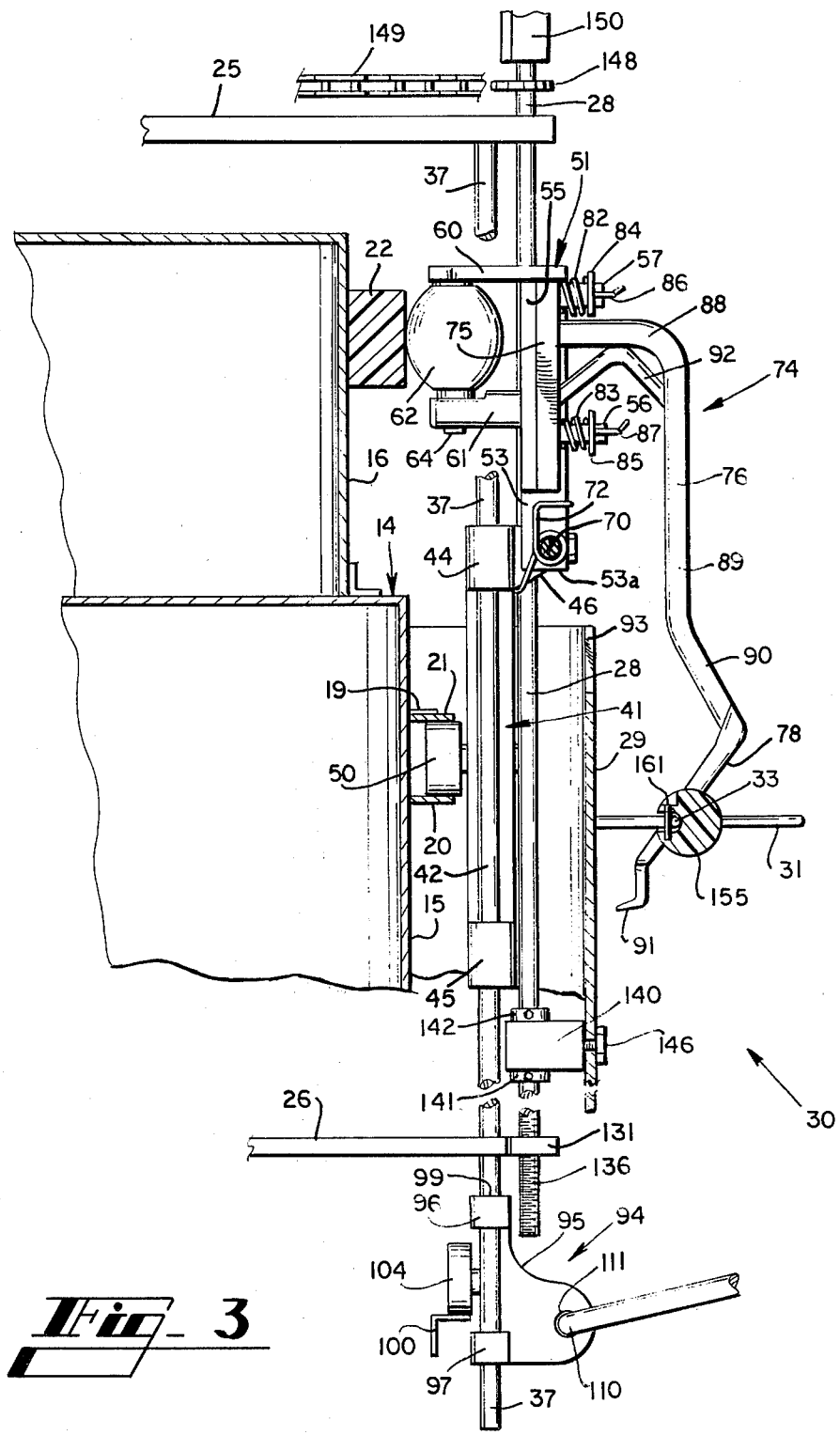

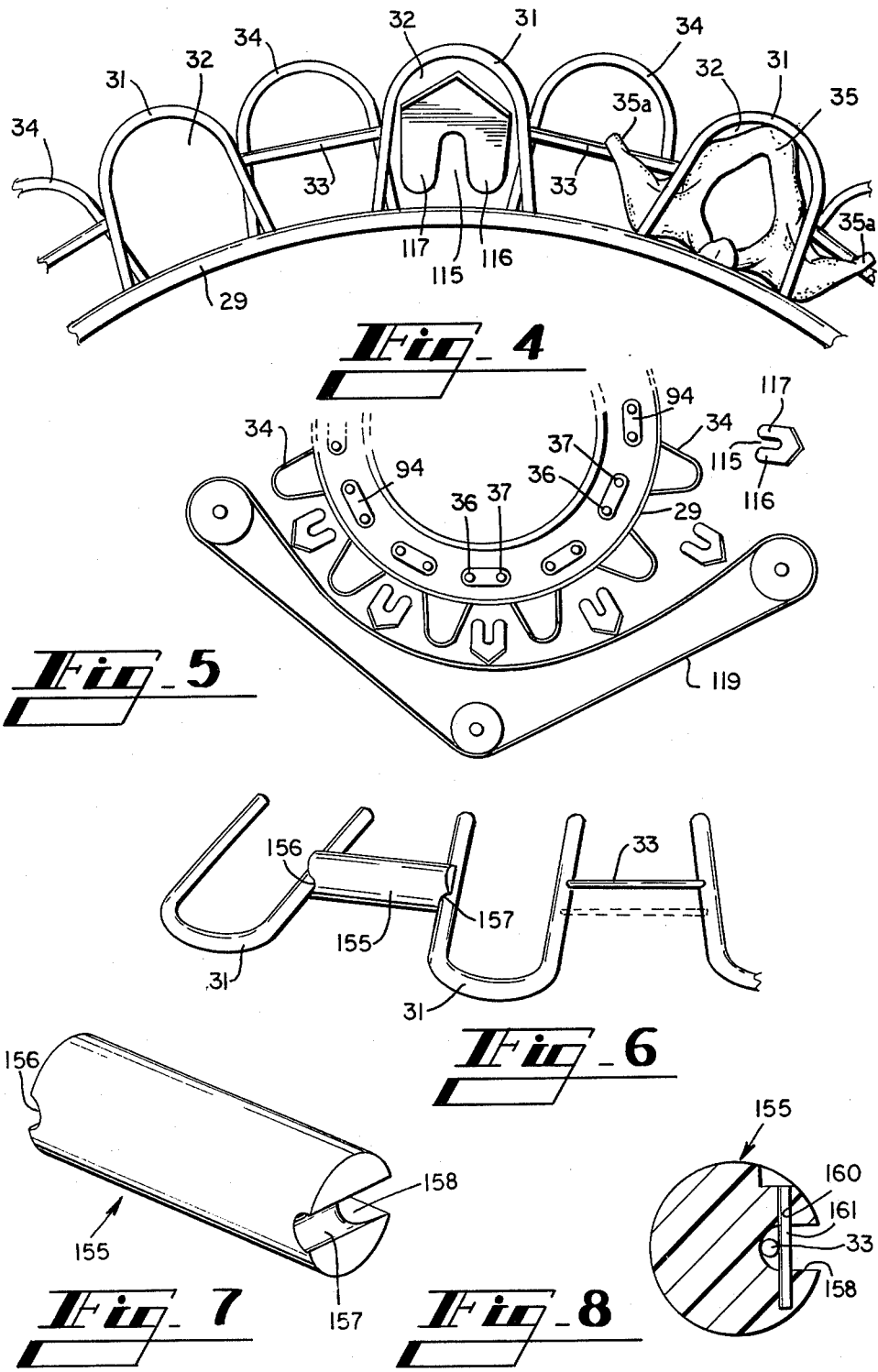

POULTRY EVISCERATOR WITH MOVABLE WORK CYLINDER

TECHNICAL FIELD

The invention disclosed herein relates to the art of removing viscera from edible fowl such as chickens and turkeys, wherein a plurality of birds are conveyed in series by an overhead conveyor in a legs-up attitude about rotating eviscerator equipment. An eviscerating tool enters the cavity of each of the birds and extracts the visera therefrom.

BACKGROUND OF THE INVENTION

Various types of automated poultry eviscerating machines have been developed which receive birds carried in a legs-up attitude on an overhead conveyor and which insert an eviscerating tool into the previously opened cavity of the bird so as to extract the viscera from the bird. Some of the prior art machines are represented by U.S. Pat. Nos. 3,653,093, 3,806,988, 3,979,793, and 3,902,221. Some of the prior art eviscerator machines require a substantial amount of rather complex hardware to cause the working elements of the system to function. For example, various latches, springs, cams, bearings and other elements have been used to cause the eviscerator tool to reciprocate and/or tilt during its viscera removal functions. These various parts are expensive to manufacture and assemble, are subject to wear and deterioration, and are subject to malfunction. The exposure of the multiple number of mechanical parts in the eviscerating process subjects the parts to an accumulation of filth which must be washed or otherwise removed from the equipment in order to comply with government sanitation requirements.

It is desirable that poultry eviscerating equipment not only function effectively to remove the viscera of the fowl with a minimum of damage to the carcass and the viscera, but also that the eviscerating function take place with a minimum of contamination from the birds to the equipment and from the equipment back to subsequent ones of the birds. One poultry eviscerator that has been developed comprises an outer work cylinder assembly which is rotated on its vertical axis by the overhead conveyor system and rotates concentrically about a stationary inner cam drum assembly. Each bird carried by the overhead conveyor is received at a work station on the outer work cylinder and is moved with the cylinder through approximately 180°. The work cylinder includes a plurality of bird guide elements protruding outwardly therefrom to guide the birds to and maintain the birds in predetermined work stations about the work cylinder during the movement of each bird about the work cylinder, and each bird is clamped against the cylindrical work surface with its back in abutment with the work surface. An eviscerator tool is thrust downwardly into the cavity of the bird while the bird is held in place against the work cylinder with the tool moving first along the breast side of the cavity and then, after reaching the bottom of the cavity, the tool is moved upwardly along the back side of the cavity. Some of the viscera passes through the loop of the tool and the viscera tends to be collected in the tool and viscera is pulled by the tool out of the cavity as the tool is moved upwardly, and as the tool withdraws from the cavity of the bird the viscera is laid over the exterior tail portion of the bird where it can be visually inspected and removed from the bird. The birds then continue to be moved by the conveyor away from the eviscerator machine.

The work cylinder functions as a moving support against which each bird can be clamped during the eviscerating step. Projections mounted on the external surface of the work cylinder guide the birds toward and help to maintain the birds in the desired location and attitude at the work cylinder while the eviscerator tools move in the cavities of the birds. The work cylinder also functions to shield the other components from contamination by the birds and the work cylinder is easy to clean.

One of the problems experienced with eviscerator machines that include elements for holding birds in position during the eviscerating procedure is that is is desirable to relocate the bird holding elements when birds of a different size are to be eviscerated. For example, if the processing line has been set to handle large chickens or turkeys and the line is later required to handle smaller chickens or guineas, the guide elements become less effective in guiding and maintaining the birds in the desired work stations during the evisceration procedure. This might result in movement of the birds at the work stations and in the eviscerator tool reaching too far into the cavity of the bird and damaging the bird or in not reaching far enough into the cavity of the bird and not retrieving the lungs or other organs from the bird.

One prior solution to moving bird holding elements has been to disconnect the work cylinder from the rest of the eviscerator, raise or lower the work cylinder and reconnect it to the eviscerator. This requires the eviscerator to be taken off the processing line or stopping the processing line for a substantial length of time.

SUMMARY OF THE INVENTION

Briefly described, the present invention comprises a poultry eviscerator machine suitable for removing the viscera from chickens, turkeys and other poultry of different sizes, whereby some of the elements of the machine which guide the birds to and maintain the birds at a position for evisceration can be adjusted to accomodate birds of different sizes. The eviscerator machine comprises an upright work cylinder that is rotatable about its upright axis in unison with the conveyor line, and guide protrusions extend outwardly from the work cylinder for the purpose of guiding the birds into and maintaining the birds in position about the work cylinder while eviscerator tools move from above and from below each bird and extract the viscera from each bird during the eviscerating function. When the size of the birds to be eviscerated changes, as when fryers have been handled by the processing line and the line is then to handle larger hens, the work cylinder of the eviscerator machine can be progressively lowered so as to move the protrusions of the work cylinder to a lower level to accomodate the larger birds without having to disconnect and reconnect the work cylinder with respect to is supporting elements of the eviscerator.

The eviscerator includes upper and lower support discs that are mounted on and rotate about a common vertical axle, and work cylinder support rods extend vertically between the peripheries of the upper and lower support discs. The work cylinder extends about and is mounted to the work cylinder support rods, and each work cylinder support rod includes a helically threaded portion which supports the work cylinder. A sprocket is mounted on each work cylinder support rod, and a continuous chain extends around each sprocket, so that when one work cylinder support rod is rotated on its own axis, all of the other work cylinder support rods rotate in unison therewith. When the work cylinder support rods are rotated as described, the helically threaded portions thereof move the work cylinder up or down with respect to the rest of the eviscerator machine, thereby causing the guide protrusions on the exterior surface of the work cylinder to move to a new level and to accomodate birds of longer or shorter length.

Thus, it is an object of this invention to provide an effective, simplified poultry eviscerator machine which functions to remove viscera from edible poultry, and which can function to eviscerate birds of different size substantially without hazard of damaging the carcass of the birds or the viscera removed from the birds.

Another object of this invention is to provide a poultry eviscerator which includes a work cylinder having guide protrusions extending outwardly therefrom for receiving birds in predetermined positions about the work cylinder, and means for rapidly and progressively raising or lowering the work cylinder and its guide protrusions.

Other objects, features and advantages of the present invention will become apparent upon reading the following specification, when taken in conjunction with the accompanying drawings.

BRIEF DESCRIPTION OF THE DRAWINGS

FIG. 1 is a side elevational view, with some parts shown in section, of the poultry eviscerator.

FIG. 2 is a perspective illustration of a portion of the poultry eviscerator, showing the cams which cause movement of the eviscerator tools and the apparatus used to raise and lower the work cylinder.

FIG. 3 is a detail side elevational view, with parts shown in cross-section, of the cam drum assembly, the upper support disc, an upper eviscerator tool, the work cylinder and a work cylinder support rod.

FIG. 4 is a top detail illustration of a portion of the work cylinder and its guide protrusions.

FIG. 5 is a schematic top cross-sectional view of the poultry eviscerator, showing the external belt cam.

FIG. 6 is a perspective detail illustration of some of the guide protrusions of the work cylinder, and showing an adaptor attachment mounted to one of the guide protrusions.

FIG. 7 is a perspective illustration of the attachment of FIG. 6.

FIG. 8 is an end cross-sectional view of the attachment of FIGS. 6 and 7.

DETAILED DESCRIPTION

Referring now in more detail to the drawings, in which like numerals indicate like parts throughout the several views, FIG. 1 illustrates the poultry eviscerator 10 which includes a support frame 11 for placement in an overhead conveyor line of a poultry processing plant (not shown). A vertical stationary support shaft 12 is supported by frame 11 and a stationary cam drum assembly 14 is mounted concentrically to support shaft 12 and includes a large diameter lower drum 15 and a small diameter upper drum 16. The cylindrical surface 18 of the large diameter lower drum 15 supports a continuous cam track 19 which is formed in a helical manner about lower drum 15. Cam track 19 includes a pair of spaced arcuate metal strips 20 and 21 for receiving a cam follower therebetween.

The small diameter upper drum 16 includes a cylindrical surface 23 which supports a continuous cam track 22 that also extends circumferentially and in a helical manner about upper drum 14. The surface of cam track 22 extends at variable radial distances from the support shaft 12 and vertical axis 24 of the apparatus; that is, cam track 22 is thick in some areas and thin in other areas.

Work cylinder assembly 24 is rotatably mounted on vertical support shaft 12 and extends concentrically about the upper and lower stationary cam drums 14 and 15. Work cylinder assembly 24 includes upper and lower support discs or turrets 25 and 26 which are rotatably supported on upright support axle 12, and four work cylinder support rods 28 are equally spaced about the peripheries of upper and lower support discs 25 and 26 and extend vertically therethrough. Work cylinder 29 is oriented in an upright attitude and is supported by the work cylinder support rods 28 in a manner described in more detail hereinafter. The work cylinder 29 functions as a cylindrical work surface against which the birds of the poultry processing system are to be moved.

A plurality of work stations 30 are equally spaced about work cylinder 24 and comprise a plurality of pre-arranged guide protrusions for guiding a bird toward and maintaining a bird in position adjacent the work cylinder 29. The work stations are arranged to receive a bird in a legs-up attitude as the bird is suspended from a shackle of the overhead conveyor (not shown) in the poultry processing plant. As illustrated in FIGS. 1, 2 and 4, the guide protrusions include a plurality of upper U-shaped guide elements 31 which are rigidly mounted to and circumferentially spaced about the external surface of work cylinder 29, with the ends of the leg portions of the U-shaped guide elements being rigidly attached to the external surface of the cylinder so as to form a bird receiving space 32 therein. One of the upper U-shaped guide elements 31 is located at each work station 30. Struts 33 are each connected at their ends to adjacent legs of adjacent ones of the U-shaped guide elements 31 and are spaced from the external surface of work cylinder 29.

A series of lower U-shaped guide elements 34 are also circumferentially spaced about external cylinder 29, and each of the guide elements 34 also includes leg portions rigidly connected to the external surface of work cylinder 29. The lower U-shaped guide elements 34 are located lower than the upper U-shaped guide elements and are positioned between the work stations 30.

As illustrated in FIG. 4, the arrangement of the upper and lower U-shaped guide elements 31 and 34 is such that the birds 35 carried by the overhead conveyor each are swung into a position beneath an upper guide element 31 and between a pair of lower guide elements 34, with its back against the work cylinder 29 and with its legs engaging the struts 33 on opposite sides of its upper U-shaped guide element 31 and with its wings below the lower U-shaped guide elements 34, and the bird is then moved upwardly into the space 32 of the upper guide element 31 by means described hereinafter, so that its vent and tail protrude up into the space 32 of the upper U-shaped guide element 31. The lower U-shaped guide elements 34 function to hold the wings of the birds as they are being moved up into position and hold the birds in position during the eviscerating function. The struts tend to hold the legs of the bird in a predetermined position away from the external surface of work cylinder 29, causing the bird to swing up into the confines of the upper U-shaped guide element 31 and locating the legs and shackle which carries the bird out of the way of the eviscerator tool.

Each work station 30 also includes a pair of parallel vertical guide bars 36 and 37 which are rigidly connected at their upper and lower ends to upper and lower support discs 25 and 26, and upper and lower eviscerator tools are mounted on each pair of guide bars 36 and 37. Specifically, the upper eviscerator tools each comprise eviscerator tool assembly 39, and the lower eviscerator tools each comprise the bird holder assembly 40. As illustrated in FIGS. 2 and 3, each eviscerator tool assembly 39 includes an upper carriage 41 which includes a carriage body 42, upper and lower side protrusions 44 and 45, front protrusion 46 and vertical openings 48 extending through the upper and lower side protrusions 44 and 45, and horizontal opening 49 extending through front protrusion 46. The vertical openings 48 are mounted about and are slidable along vertical guide bars 36 and 37. A cam roller 50 is rotatably mounted to the back of carriage body 42 and extends into the cam track 19 of cam drum 14.

As illustrated in FIGS. 2 and 3, each eviscerator tool assembly 36 also includes tool support 51 which comprises a frame consisting of a pair of spaced vertical side walls 52 and 53 and a horizontal top wall 54 connected at its ends to the upper sides of side walls 52 and 53, and an internal support plate 55 connected at its edges to side walls and top wall 52, 53 and 54. A pair of tool mounting studs 56 and 57 extend from one surface of flat support plate 55 in parallel spaced apart relationship with respect to each other, and each stud defines a cotter pin opening therethrough. A cam follower bracket extends from the opposite surface of inner support plate 55 and includes upper and lower bracket elements 60 and 61. Cam roller 62 is mounted between the upper and lower bracket elements 61 and 62 on an axle 64. Thus, cam roller 62 is rotatably supported in the bracket elements 60 and 61.

The lower end portions, such as end portion 52a of side wall 52 of tool support 51, protrude downwardly from support plate 55, and aligned axle openings are defined therein. Pivot pin 70 extends through the axle openings and through a torsion spring 72 and through front protrusion 46 of upper carriage 51. Thus, tool support 51 is tiltably mounted on upper carriage 41 about pivot pin 70, and torsion spring 72 has its upper end portion extending about a side wall 53 of tool support 51 and its lower portion is in abutment with the upper carriage 41 so as to urge the tool support 51 in a counter clockwise direction (FIGS. 2 and 3) toward engagement with cam surface 22 of upper cam drum 16.

Each eviscerator tool assembly 39 includes eviscerator tool 74, and the tool comprises a mounting plate 75, L-shaped stem 76 and lower loop 78. Mounting plate 75 is substantially flat and fits the space defined by side walls 52 and 53 and top wall 54 of tool support 51 and includes a pair of upper and lower spaced openings which are sized and spaced in accordance with the size and spacing of tool mounting studs 56 and 57 of tool support 51. Thus, mounting plate 75 is mounted to tool support 51 by inserting the openings of mounting plate 75 about the studs 56 and 57. Coil compression springs 82 and 83 extend about studs 56 and 57, washers 84 and 85 abut springs 82 and 83, and cotter pins 86 and 87 extend through the cotter pin openings of the studs 56 and 57 to hold the eviscerator tool 74 on the tool support 51, by biasing the mounting plate 75 in flat abutment with the support plate 55. A more detailed illustration of the upper eviscerator tool 74 is found in U.S. Pat. No. Des. 256,802.

The L-shaped stem 76 of eviscerator tool 74 includes an upper horizontal portion 88 that extends perpendicular to the flat mounting plate 75 and the stem turns downwardly to a vertical attitude intermediate its ends at 89. The stem then turns outwardly at 90 toward an inclined attitude, and the loop 78 is turned back to the opposite inclined attitude. A pair of spaced protrusions 91 are formed at the bottom of loop 78, and a brace 92 extends between the vertical portion 89 and the horizontal portion 88 of stem 76 and to the surface of mounting plate 75. A V-shaped notch 93 is formed in the upper edge of work cylinder 29 at each work station, so that the brace 92 and the horizontal portion 88 of each eviscerator tool 74 can move down to a level lower than the upper edge of work cylinder 29, as may be necessary.

As illustrated in the lower portion of FIG. 2, each work station 30 also includes a lower carriage 94 slidably mounted on the pairs of vertical guide bars 36 and 37. Lower carriage 94 is similar to upper carriage 41 in that it includes a carriage body 95, upper and lower side protrusions 96 and 97 and front protrusion 98. The upper and lower side protrusions 96 and 97 define vertical openings 99 which extend therethrough and these openings are inserted about the vertical guide bars 36 and 37.

Lower carriage cam track 100 extends helically about the lower portion of the poultry eviscerator 10 (FIGS. 1 and 2). The lower carriage cam track 100 is supported from vertical stationary support shaft 12 by central support block 101 mounted on shaft 12 and by radiating arms 102. Each lower carriage 94 includes a cam roller 104 which engages and follows the elevation of lower carriage cam track 100 thus functioning to raise and lower the lower carriage 94 on the vertical guide bars 36 and 37.

The central support block 101 is vertically movable along the support shaft 12 so as to raise or to lower the lower carriage cam track 100. This causes the paths of the bird holders 105 to be positioned closer to or further away from the upper eviscerator tool 74, to accomodate smaller or larger birds. Support block 101 is supported by jack 103 that is mounted on the frame 11, and jack 103 can be remotely operated to raise or lower shaft 12 by rotating its jack handle 104.

A bird holder 105 is carried by each lower carriage 94 and includes stem 106 and holder plate 108. Stem 106 is connected at its lower end portion 109 to axle 110, and axle 110 extends through a horizontal opening 111 formed in the front protrusion 98 of lower carriage 94. Thus, bird holder 105 is tiltable about a horizontal axis extending through lower carriage 94. Each stem 106 is angled at 112 so that its lower portion 109 is inclined upwardly from lower carriage 94 and its upper, more upright portion 114 is located outwardly of the external surface of work cylinder 29. The upper end portion 114 of stem 106 is rigidly connected to holder plate 108. Holder plate 108 is of concave configuration which generally conforms to the exterior surface of the type birds to be eviscerated by the system, and includes a neck opening 115 defined by the lower lateral protrusions 116 and 117 on either side of the neck opening 115, and the protrusions are movable toward and away from engagement with the external surface of work cylinder 29. A belt 119 (FIG. 5) extends around an arcuate portion of the poultry eviscerator and urges each bird holder 105 toward work cylinder 29 as the bird holders rotate with the work cylinder 29.

As illustrated in FIG. 1, the poultry eviscerator 10 includes a power takeoff wheel 118 at its upper portion which is freely rotatably mounted on the upper end portion of vertical support shaft 12, and the conveyor chains of the overhead conveyor system (not shown) extend 180° about the power takeoff wheel 118. An upright extension 119 is rigidly connected to the upper support disc 25, and sleeve 120 telescopes about extension 119. When the eviscerator machine is to be rotated by the overhead conveyor system, the telescoping sleeve 120 is moved up on its extension 119 until it engages a spoke of power takeoff wheel 118, and the sleeve 120 is locked in its position on the extension 119 by means of a set screw or other lock member 121. Thus, the overhead conveyor system can continuously rotate the power takeoff wheel 118, and when the sleeve 120 is moved up into engagement with the power takeoff wheel 118, the eviscerator is placed in operation.

As illustrated in FIG. 2, the work cylinder support rods 28 extend between the peripheries of the upper and lower support discs 25 and 26. The guide bars 36 and 37 are also mounted adjacent the periphery of the upper lower support discs 25 26. Notches 125 are formed in the peripheral edge of both the upper and lower support discs 25 and 26, and lock blocks 126 extend into the notches 125 and clamp the upper and lower ends of the guide bars to the upper and lower support discs. A screw 128 extends horizontally through each lock block 126 and is threadedly received in the support disc to hold its lock block in place.

The work cylinder support rods 28 are held in position by upper and lower support brackets 130 and 131. The brackets 130 and 131 are similar in shape in that each conforms to the shape of the upper and lower support discs 25 and 26, each includes a vertical opening 132 and a pair of spaced apart horizontal openings on opposite sides of the vertical opening 132. The upper support brackets 130 are positioned outside the clamp blocks 126, and screws 134 extend through both the support bracket 130 and a clamp block 126 into the support disc. With this arrangement, the screws 134 hold both the support brackets 130 and clamp blocks 126 in position. The vertical opening 132 of upper clamp block is larger than the outside dimensions of work cylinder guide rod 28 while the vertical opening 132 of lower bracket 131 is internally threaded. The lower end portion of each work cylinder guide rod 28 is externally threaded at 136, and the threads 136 mate with the internal threads of the vertical opening 132 of the lower bracket 131. Thus, when work cylinder guide rods 28 are rotated, the threads 136 cause the guide rods to move vertically.

As illustrated in FIG. 2, each work cylinder guide rod 28 includes a mounting block 140. The mounting blocks each include a vertical opening (not shown), and the opening of the mounting block extends about the guide rod. Lock collars 141 and 142 are positioned on opposite sides of mounting blocks 140, and the lock collars are rigidly connected to the guide rods 28 by set screws, etc. (not shown). Thus, the guide rods 28 can be rotated with respect to their mounting blocks 140 and the mounting blocks 140 will remain between the lock collars 141 and 142.

Each mounting block 140 includes a threaded bore 144 that faces the internal surface of work cylinder 29. Openings 145 are formed at intervals about work cylinder 29 which correspond to the spacing of work cylinder support rods 28 and their mounting blocks 140. Screws 146 extend through the openings 145 and into the internally threaded bores 144 of the mounting blocks so as to mount the work cylinder 29 on the mounting blocks 140.

Chain sprockets 148 are rigidly mounted to the upper ends of each work cylinder mounting rod 28. A continuous roller chain 149 extends about each chain sprocket 148, so that rotation of one of the mounting rods 128 results in the rotation of its chain sprocket 148 and movement of the chain 149, thus requiring all of the chain sprockets 148 and mounting rods 28 to rotate in unison therewith. At least one of the work cylinder mounting rods 28 will have at its upper portion a non-circular element, such as rectangular block 150, which facilitates rotation of the mounting rod 28. With this arrangement, a worker can grasp and rotate the upper portion of one of the mounting rods 28, thus causing all of the mounting rods to rotate in unison therewith, and the work cylinder 29 will be raised or lowered a distance corresponding to the amount of rotation applied to the mounting rods 28.

In order to further facilitate accomodation of larger and smaller birds on the eviscerator machine, adaptor bars 155 can be mounted to the struts 33 so as to effectively displace the legs of larger birds further away from work cylinder 29. As illustrated in FIGS. 6-8, each adaptor bar 155 is approximately circular in cross-section and includes notches 156 and 157 at its opposite ends and a slot 158 extending between notches 156 and 157. The adaptor bars 155 are of a length slightly greater than the space between adjacent ones of the upper guide loops 31 so that the notches 156 and 157 fit snuggly against the adjacent legs of adjacent ones of the upper guide loops 31. The slot 158 is positioned about the strut 33. A bore 160 extends through the adaptor bar and intersects the slot 158 (FIG. 8), and lock pin 161 is positioned in the bore 160 behind the strut 33, thus locking the adaptor bar to the strut 33.

OPERATION

When the poultry eviscerator 10 is placed in operation in a poultry processing plant, the overhead conveyor system rotates power takeoff wheel 118 and the telescoping connector 119-121 (FIG. 1) intersects the wheel 118 and rotates the upper and lower support discs 25 and 26, the guide bars 36 and 37, the work cylinder mounting rods 28 and the work cylinder 29 about the vertical support shaft 12 and inner cam drum assembly 14. As each shackle (not shown) that bears a bird approaches a work station 30, each shackle is guided by guide rods and other guide means (not shown) toward the external surface of work cylinder 29 to place a bird at each work station, with the back of the bird adjacent the external surface of work cylinder 29. The legs 35a (FIG. 4) of each bird straddle a U-shaped guide element 31 and the upwardly extending tail portion of the bird body is initially placed below the upper guide element 31. The struts 33 and the adapter bars (FIGS. 7-9) that extend between adjacent ones of the upper U-shaped guide elements 31 keep the legs from moving too close to the external surface of work cylinder 29 and hold the legs of the bird at equally spaced distances from the exterior surface of work cylinder 29, and the shackle (not shown) which carries the bird from the overhead conveyor therefore is maintained in spaced relationship with respect to the work cylinder 29.

When the birds are first received at each work station, the eviscerator tool 74 and bird holder 105 are in their up and down positions, respectively, away from their work station. As the work cylinder 24 continues to rotate, the bird holder 105 is urged by cam belt 119 (FIG. 5) to tilt or swing through an upward arc toward the bird, thus trapping the bird against the surface of work cylinder 29. Immediately thereafter, the lower carriage 94 of the bird holder is elevated on its lower carriage cam track 100 (FIG. 2) so as to lift the bird and move the tail portion of the bird upwardly until it protrudes up through the opening of the upper U-shaped guide element 31. In the meantime, the eviscerator tool 74 begins to move downwardly toward the vent opening of the bird by the upper carriage 41 following its cam track 19 through a downward incline. This causes the lower end of the loop 78 of tool 74 to begin the entry into the cavity of the bird.

As the work cylinder continues its movement, the eviscerator tool 74 approaches the lower end of its downward movement, and tool 74 tilts inwardly as the cam roller 62 (FIG. 3) engages a thicker section of cam track 22, so that the lower portion of loop 78 moves closer to work cylinder 29. When in this position, the loop is passing through the lower portion of the cavity of the bird. Further movement of the work cylinder causes upper carriage 41 to begin its upward movement, so as to withdraw the eviscerator tool 74 from the cavity of the bird. As the carriage 41 approaches the upper limit of its movement, the eviscerator tool begins to pivot again, swinging away from the work cylinder 29. In the meantime, the majority of the viscera of the bird will have moved into and partially through the loop 78 of the tool 74, and the viscera is lifted upwardly and out of the cavity of the bird. When the eviscerator tool 74 has withdrawn from the cavity of the bird, it will be tilted outwardly again so as to lay the viscera of the bird over the tail portion of the bird, so that the viscera is available for inspection and easy removal from the bird carcass.

When the eviscerator tool has been withdrawn from the cavity of the bird, the bird holder 105 will move beyond the cam belt 119 (FIG. 5) so that gravity causes the bird holder to swing away from work cylinder 29, and lower carriage cam track 100 guides the lower carriage in a downward direction so that the bird holder moves downwardly away from the bird. The bird then moves downwardly out of the confines of the upper loop 31 and is free to move on with the overhead conveyor system away from the poultry eviscerator machine 10.

When birds of a larger or of a smaller size are to be handled by the eviscerator machine 10, it is desirable to lower or to raise the guide protrusions such as upper and lower guide loops 31 and 34 and struts 33. Thus, the longer legged birds whose bodies hang lower than shorter legged birds can be received in the guide loops at a lower level. This is accomplished by a worker rotating the work cylinder mounting rods 28. When the worker rotates one of the work cylinder mounting rods the continuous chain 149 that extends about the sprockets 148 on each mounting rod 28 causes all of the mounting rods to rotate in unison. This causes the mounting rods to thread further down into or out of the lower support disc 26 causing the mounting thread upwardly block 140 on each mounting rod 28 to move vertically. This results in the work cylinder 29 and its guide loops moving vertically.

In the event that it is desirable to hold the legs of the birds further away from the work cylinder 29, the adaptor bars 155 (FIGS. 6–8) can be placed on the struts 33 so as to effectively displace the surfaces of the struts further away from the work cylinder 29.

While the means for raising or lowering the work cylinder 29 has been illustrated as comprising a threaded portion 136 of the work cylinder support rod 28 extending through the threaded bore of the bracket 131 attached to the lower support disc 26, it will be understood by those skilled in the art that other means for raising and lowering the mounting block 140 can be provided. For example, the threads of the mounting rod 28 can be located at the upper end of the mounting rod and extend through a threaded bracket, or the threads can be located intermediate the ends of the work cylinder mounting rod and the vertical bore extending through the mounting block 140 can be threaded. With any of these arrangements the mounting rods function like travel screws to progressively raise and to lower the work cylinder 29 and the guide protrusions 31-34 carried thereby.

While it is not illustrated in this disclosure, the poultry eviscerator will be continuously cleaned by water spray applied to the eviscerator tools 74, bird holders 105 and to the external surface of the work cylinder 29.

It should be understood that the foregoing description relates only to a preferred embodiment of the present invention, and that numerous modifications or alterations may be made therein without departing from the spirit and scope of the invention as set forth in the appended claims.

I claim:

1. In apparatus for eviscerating poultry including a vertical axle, at least one support disc coaxially mounted on said axle, a plurality of guide rods mounted on said support disc and arranged vertically in a circular array, a work cylinder supported by said support disc and extending coaxially with respect to said guide rods, said work cylinder including at circumferentially spaced intervals thereabout poultry guide elements for guiding poultry to and maintaining poultry in predetermined positions about said work cylinder, eviscerator tools mounted on and movable along the lengths of said guide rods and movable with respect to the outer surface of said work cylinder and its poultry guide elements, and means for rotating said support disc, guide rods and work cylinder in unison about said vertical axle, the improvement therein of means for progressively raising and for progressively lowering said work cylinder and its poultry guide elements with respect to said guide rods and eviscerator tools as the work cylinder rotates about the vertical axle whereby the distances between the poultry guide elements and the eviscerator tools can be adjusted as birds are being eviscerated.

2. The invention of claim 1 and wherein said means for progressively raising and for progressively lowering said work cylinder comprises a plurality of vertically extending travel screws supported by said support disc, said travel screws each including an externally helically threaded portion, a mounting block extending about each said travel screw, each mounting block being mounted to said work cylinder, said mounting blocks each being supported by the threaded portion of its travel screw, and means for rotating said travel screws in unison to raise or lower the mounting blocks and said work cylinder.

3. The invention of claim 2 and wherein said at least one support disc comprises an upper support disc and a lower support disc positioned below said upper support disc, and wherein the threaded portion of each travel screw is threaded through said lower support disc, whereby rotation of said travel screws causes the travel screws to move upwardly through or downwardly through said lower support disc.

4. The invention of claim 1 and wherein said work cylinder surrounds said guide rods and defines a plurality of circumferentially spaced recesses formed in its upper edge portion, and wherein each of said eviscerator tools are movable vertically toward and away from one of said recesses.

5. The invention of claim 2 and wherein said means for rotating said travel screws in unison comprises a gear rigidly mounted to each travel screw, and a continuous chain means extending about all of said gears, and means at the upper end portion of at least one of said travel screws for rotating its travel screw.

6. In apparatus for eviscerating poultry including an upright work cylinder rotatable about its upright axis, wherein birds are suspended from their legs and moved in an arcuate path about the rotating work cylinder, wherein the work cylinder includes a plurality of poultry guide elements extending outwardly therefrom at circumferentially spaced intervals thereabout for guiding the birds to and maintaining the birds at predetermined positions about said work cylinder, and a plurality of eviscerator tools are rotatable with said work cylinder and are movable vertically and radially with respect to said work cylinder, the improvement therein of adjusting means for progressively raising and lowering said work cylinder with respect to said eviscerator tools whereby the poultry guide elements are located at a higher or lower position with respect to the eviscerator tools when birds of different sizes are to be eviscerated.

7. The invention of claim 6 and wherein said apparatus includes an upright axle, upper and lower support discs axially mounted one above the other in spaced relation on said axle, and wherein said adjusting means comprises a plurality of support rods mounted at their ends to said upper and lower support discs, at least one mounting block rotatably mounted to each said support rod and connected to said work cylinder, and means for rotating all of said support rods in unison each about their respective longitudinal axes, and means responsive to the rotation of said support rods to raise or to lower said work cylinder.

8. In an eviscerastor apparatus for removing viscera from fowl, a work cylinder rotatable about its longitudinal axis, a first plurality of U-shaped guide elements spaced about said work cylinder with the legs of the first plurality of U-shaped guide elements attached at their ends to said work cylinder at a first level about said work cylinder, a second plurality of U-shaped guide elements spaced about said work cylinder with the legs of the second plurality of U-shaped guide elements attached at their ends to said work cylinder at a second level about said work cylinder below said first level, with each of said U-shaped guide elements of said second plurality of U-shaped guide elements being offset from vertical alignment with each of said U-shaped guide elements of said first plurality of guide elements, an eviscertor tool movable from above each of said U-shaped guide elements of said first plurality of U-shaped guide elements down into its U-shaped guide element, and a plurality of bird holders each individually movable toward and away from said work cylinder at positions between each said U-shaped guide elements of said second plurality of U-shaped guide elements and below each said U-shaped guide elements of said first plurality of U-shaped guide elements, and means for progressively raising and lowering said work cylinder comprising a plurality of vertically oriented travel screws positioned inside said work cylinder at circumferentially spaced intervals about the work cylinder, a mounting block rotatably receiving each travel screw and rigidly fastened to said work cylinder, each travel screw including helical threads for raising and lowering its mounting block, sprocket means rigidly fastened to each travel screw, and a timing chain extending about all of said sprocket means, whereby when one travel screw is rotated all of the travel screws are rotated in unison to raise or lower the work cylinder with respect to all of said eviscerator tools and said bird holders.

9. An eviscerator apparatus comprising a stationary inner cam drum assembly having its longitudinal axis normally extending vertically, a work cylinder assembly mounted concentrically about said cam drum assembly, means for rotating said work cylinder assembly about said cam drum assembly, said work cylinder assembly including a plurality of work stations circumferentially spaced thereabout with each work station including a pair of vertical guide bars, an upper carriage mounted on each said pair of guide bars and movable therealong, an eviscerator tool pivotally mounted on each said carriage, an upper carriage cam extending helically about said cam drum assembly, said upper carriages, each including a cam follower in engagement with said upper carriage cam, and a tilt cam extending about said cam drum assembly and extending at varying radial distances about said cam drum assembly, an eviscerator tool cam follower mounted to each said eviscerator tool and in engagement with said tilt cam, whereby as the work assembly rotates about the cam drum the upper carriage cam and the upper carriage cam follower of each carriage cause the upper carriages to reciprocate on their guide bars and the tilt cam and the eviscerator tool cam follower of each eviscerator tool cause the eviscerator tools to tilt, said work cylinder assembly including a work cylinder with poultry guide protrusions extending outwardly therefrom at each work station, the improvement therein of means for progressively raising and lowering said work cylinder with respect to all of said eviscerator tools comprising a plurality of vertically oriented travel screws positioned inside said work cylinder and spaced circumferentially about said work cylinder, means for rotating said travel screws in unison about their own axes, a mounting block receiving each travel screw and each rigidly mounted to said work cylinder, said mounting blocks and travel screws including means for raising and lowering said work cylinder in response to the rotation of said travel screws.

10. In an eviscerator apparatus comprising a work cylinder assembly rotatable about its longitudinal axis, means for rotating said work cylinder assembly about its longitudinal axis, a plurality of work stations circumferentially spaced about and movable with said work cylinder assembly, said work cylinder assembly including a work cylinder with guide protrusions rigidly mounted thereto and extending outwardly from said work cylinder at each work station, each of said work stations including a pair of parallel vertical guide bars, an upper carriage and a lower carriage slidably mounted on each pair of guide bars, an eviscerator tool pivotally mounted to each upper carriage and bird holder pivotally mounted to each lower carriage, and cam means for raising and lowering both said upper and lower carriages and for tilting said eviscerator tools and said bird holders as said cylindrical assembly rotates, the improvement therein of means for progressively raising and lowering said work cylinder and its guide protrusions with respect to all of said eviscerator tools and bird holders as the work cylinder rotates about its longitudinal axis to accommodate birds of varying sizes.

* * * * *